United States Patent
Wautier

(10) Patent No.: US 8,012,540 B2
(45) Date of Patent: Sep. 6, 2011

(54) AQUEOUS EMULSION COMPRISING A FUNCTIONALIZED POLYOLEFIN AND CARBON NANOTUBES

(75) Inventor: Henri Wautier, Braine-le-Comte (BE)

(73) Assignee: Addcomp Holland BV, DR Nijverdal (NL)

( * ) Notice: Subject to any disclaimer, the term of this patent is extended or adjusted under 35 U.S.C. 154(b) by 416 days.

(21) Appl. No.: 12/296,040

(22) PCT Filed: Apr. 5, 2007

(86) PCT No.: PCT/EP2007/053361
§ 371 (c)(1),
(2), (4) Date: Oct. 3, 2008

(87) PCT Pub. No.: WO2007/116014
PCT Pub. Date: Oct. 18, 2007

(65) Prior Publication Data
US 2010/0159126 A1    Jun. 24, 2010

(30) Foreign Application Priority Data
Apr. 7, 2006 (FR) .................................... 06 03110

(51) Int. Cl.
*B05D 3/02* (2006.01)
(52) U.S. Cl. .................................... 427/384; 427/385.5
(58) Field of Classification Search .................. None
See application file for complete search history.

(56) References Cited

U.S. PATENT DOCUMENTS

| | | | |
|---|---|---|---|
| 5,709,946 A * | 1/1998 | Jackson et al. ............ | 428/413 |
| 6,462,122 B1 | 10/2002 | Qian et al. | |
| 6,777,473 B1 * | 8/2004 | Collard et al. ............ | 524/336 |
| 6,783,746 B1 | 8/2004 | Zhang et al. | |
| 2002/0198329 A1 * | 12/2002 | Williams et al. .......... | 525/329.7 |
| 2003/0187120 A1 | 10/2003 | Chaiko et al. | |
| 2003/0207984 A1 | 11/2003 | Ding et al. | |
| 2005/0131147 A1 | 6/2005 | Brule | |
| 2007/0293628 A1 | 12/2007 | Piernot et al. | |

FOREIGN PATENT DOCUMENTS

| | | |
|---|---|---|
| EP | 1449885 A1 | 8/2004 |
| EP | 1514842 A1 | 3/2005 |
| FR | 2876696 A1 | 4/2006 |
| JP | 2000136308 A | 5/2000 |
| JP | 2003073558 A | 3/2003 |
| WO | WO0148080 A1 | 7/2001 |
| WO | WO2004011569 A1 | 2/2004 |
| WO | WO2004067261 A1 | 8/2004 |
| WO | WO2004097853 A1 | 11/2004 |

OTHER PUBLICATIONS

PCT Search report dated Jul. 4, 2008 for International Application No. PCT/EP2007/053361 (4 pg.).
Bafna A. et al., "Polyethylene-clay nanocomposites films: Processing structure-property relationship", Polymeric Materials : Science & Engineering (Preprints), 2004, 91, p. 916-917 (2 pg.).
Kirk-Othmer Encyclopedia of Chemical Technology (© John Wiley & Sons 2005), vol. 17, Nanotechnology, pp. 2 to 5 (4 pg.).
Chen L. et al., "Deformation mechanisms of nanoclay-reinforced polypropylene", J. Polymer Science—Part B—Polymer Physics, 2004, 42(14), p. 2759-2768 (10 pg.).
Chen X. & Shen J., "Study of maleic anhydride grafted polypropylene/graphite electrically conductive nanocomposites", Gaofenzi Xuebao, 2002, (3), p. 331-335 [CAS Abstract Only] (1 pg.).
Lee J.A. et al., "Polyolefin nanocomposites using maleic anhydride modified polyolefins", Annual Technical Conference, Society of Plastics Engineers, 2002, 2, p. 2230-2234 (5 pg.).
Liu Y. et al., "Modification of polyethylene powder coatings", Tuliao Gongye, 2003, 33(3), p. 6-8 [CAS Abstract Only] (1 pg.).
Martin D. et al., "Polyethylene-layered silicate nanocomposites for rotational moulding", Polymer International, 2003, 52(11), p. 1774-1779 (7 pg.).

* cited by examiner

*Primary Examiner* — Erma Cameron
(74) *Attorney, Agent, or Firm* — Oblon, Spivak, McClelland, Maier & Neustadt, L.L.P.

(57) ABSTRACT

Aqueous emulsion comprising:
(i) at least one functionalized polyolefin (gPO), obtained by grafting, on at least one unfunctionalized polyolefin (PO), acid and/or anhydride groups, the acid and/or anhydride groups being optionally completely or partially neutralized by at least one neutralizing agent;
(ii) at least one emulsifier;
(iii) at least one dispersant containing water; and
(iv) carbon nanotubes.

16 Claims, No Drawings

AQUEOUS EMULSION COMPRISING A FUNCTIONALIZED POLYOLEFIN AND CARBON NANOTUBES

The present invention relates to an aqueous emulsion comprising a functionalized polyolefin and carbon nanotubes. It also relates to a process for manufacturing this aqueous emulsion. It further relates to a particular use of this aqueous emulsion.

Carbon nanotubes constitute a new form of material made from elementary carbon. Processes for preparing them, their properties and several of their potential applications have been described, for example in the work "Carbon Nanotubes—Preparation and Properties" published in 1997 by T. W. Ebbesen (©CRC Press Inc.), the content of which is incorporated by reference in the present description.

The general description of the structure of materials that are commonly denoted by the term "carbon nanotubes" appears, in particular, in document U.S. Pat. No. 6,783,746, the content of which is also incorporated by reference in the present description.

Conceptually, single-wall carbon nanotubes (SWCNTs) can be represented as formed from layers of graphene (consisting of two-dimensional graphite crystals) rolled up in the shape of cylinders capped at each of their ends with half molecules of fullerene (spherical assembly in which the carbon atoms are generally present in the form of twelve pentagonal units optionally surrounded by twenty hexagonal units). Depending on the method of rolling up the graphene layers, "armchair", "zigzag" or chiral SWCNTs can be differentiated. Coaxial assemblies of several SWCNTs having different diameters are commonly known as "multi-wall carbon nanotubes" (MWCNTs). In these nanotubes, the carbon atoms are linked together covalently by $sp^2$ hybrid configuration of their 2s, $2p_x$ and $2p_y$ electron orbitals. Finally, the carbon nanotubes may have a length (L) considerably greater than their diameter (D); if D can generally vary between a fraction of a nanometer and around one hundred nanometers (depending on whether it is a SWCNT or a MWCNT), L may reach several hundreds of microns (see, for example Kirk-Othmer Encyclopedia of Chemical Technology (©John Wiley & Sons 2005), volume 17, Nanotechnology, pages 2 to 4).

This particular atomic and chemical structure gives carbon nanotubes exceptional properties. Their mechanical properties (tensile strength, compressive strength, flexibility, etc.) are extraordinary. Depending on the method of rolling up the graphene layers being used in their composition, they may be conductors or semiconductors (Kirk-Othmer Encyclopedia of Chemical Technology, supra, page 5). They are good thermal conductors along the longitudinal axis of the tube and good thermal insulators perpendicular to this axis.

One industrial application of carbon nanotubes taking advantage of some of these properties is mentioned in document U.S. Pat. No. 6,783,746 cited above. It consists in introducing these nanotubes into a liquid in order to modify the chemical and/or physical properties thereof. It is thus possible to improve, for example, the heat capacity of this liquid, its electrical properties, its viscosity, its lubricating abilities, etc. Document U.S. Pat. No. 6,783,746 also mentions that the uniform and stable dispersion of carbon nanotubes in an organic or aqueous liquid medium presents serious problems, on account of the tendency that these nanotubes have to form agglomerates.

The Applicant has, despite this unfavourable prejudice, thought of making use of the principle of introducing nanotubes into a liquid in order to incorporate them into an aqueous emulsion comprising a polymer, more precisely a functionalized polymer so as to modify the properties thereof. The conventional method for incorporating a solid filler into a polymer in the melt state cannot actually be easily applied when it comes to dispersing carbon nanotubes as the filler in the polymer.

The main subject of the present invention is therefore an aqueous emulsion comprising:
(i) at least one functionalized polyolefin (gPO), obtained by grafting, on at least one unfunctionalized polyolefin (PO), acid and/or anhydride groups, the acid and/or anhydride groups being optionally completely or partially neutralized by at least one neutralizing agent;
(ii) at least one emulsifier;
(iii) at least one dispersant containing water; and
(iv) carbon nanotubes.

For the purposes of the present invention, the term "emulsion" will advantageously be used to denote a composition of materials comprising solid particles dispersed essentially uniformly and stably in a liquid dispersant. A person skilled in the art will understand however that some other particular emulsions, such as those comprising both globules of molten material (for example of molten functionalized polyolefin) and of solid particles (for example, carbon nanotubes) are also part of the invention described here.

It is normally understood to mean that the solid particles are dispersed essentially uniformly in a liquid dispersant, when, under lighting conditions usually advised for a workplace (about 400 lux), the human eye is incapable of perceiving a possible difference in concentration that could present, at room temperature (23° C.), the solid particles depending on the place where they are located in the dispersion that contains these particles and this liquid dispersant.

It is normally understood to mean that the solid particles are dispersed in an essentially stable manner in a liquid dispersant, when they do not settle therein in a manner that is perceptible to the naked eye, after a rest period of one day at room temperature (23° C.). Preferably, the duration before perceiving a possible settling exceeds one week, and even more preferably, one month. It is well known to a person skilled in the art that the settling phenomenon generally induces the formation of a concentration gradient of the solid particles in the liquid dispersant, and may be observed visually so that the visual assessment will also be carried out under the lighting conditions normally advised for a workplace (about 400 lux).

The aqueous emulsion according to the invention comprises (i) at least one functionalized polyolefin (gPO), obtained by grafting acid and/or anhydride groups onto at least one unfunctionalized polyolefin (PO).

In the present description, the term "unfunctionalized polyolefin" is understood to mean a polyolefin free from functional groups, whatever type they may be, and in whatever form they may be.

Preferably at least 80% by weight, particularly preferably at least 90% by weight and most particularly preferably all the repeat units of the unfunctionalized polyolefin (PO) are derived from at least one olefin.

Advantageously, more than 50% by weight of the repeat units of the unfunctionalized polyolefin (PO) are derived from one and the same olefin (O).

The olefin (O) is preferably linear.

The olefin (O) preferably comprises from 2 to 8 carbon atoms, particularly preferably from 2 to 6 carbon atoms.

A most particularly preferred olefin (O) is propylene. In the present description, the term "polypropylene" is understood to mean a polyolefin of which more than 50% by weight of the repeat units are derived from propylene. Good results have been obtained when the unfunctionalized polyolefin (POl) was a polypropylene.

The unfunctionalized polyolefin (PO) may especially be a homopolymer or a copolymer.

Possible comonomers of the olefin (O) are advantageously chosen from the linear olefins described above, from styrene (optionally substituted by one or more hydrocarbyl groups), from diolefins comprising from 4 to 18 carbon atoms, such as 4-vinylcyclohexene, dicyclopentadiene, methylenenorbornene and ethylidenenorbornene, 1,3-butadiene, isoprene and 1,3-pentadiene. Preferably, they are chosen from the linear olefins above.

Preferably at least 60% by weight, and particularly preferably at least 65% by weight of the repeat units of the unfunctionalized polyolefin (PO) are derived from the olefin (O).

Excellent results have especially been obtained when the unfunctionalized polyolefin (PO) was a propylene homopolymer or a random copolymer of propylene and ethylene comprising from 2 to 6% by weight of repeat units derived from ethylene.

The acid and/or anhydride groups are generally grafted onto the unfunctionalized polyolefin (PO) via at least one graftable monomer, possibly in the presence of at least one radical-generating agent.

The acid and/or anhydride groups are preferably grafted onto the unfunctionalized polyolefin (PO) via at least one graftable monomer and at least one radical-generating agent.

The graftable monomer may be a monoethylenically unsaturated monocarboxylic or dicarboxylic acid, or an anhydride or a metal salt derived from the monocarboxylic or dicarboxylic acid. The graftable monomer preferably comprises from 3 to 20 carbon atoms. The graftable monomer is particularly preferably chosen from acrylic acid, methacrylic acid, maleic acid, fumaric acid, itaconic acid, crotonic acid, citraconic acid, maleic anhydride, itaconic anhydride, crotonic anhydride and citraconic anhydride. As the graftable monomer, maleic anhydride is most particularly preferred.

As examples of radical-generating agents, mention may especially be made of tert-butylcumyl peroxide, 1,3-di(2-tert-butylperoxyisopropyl)benzene, 2,5-dimethyl-2,5-di(tert-butylperoxy)hexane, di(tert-butyl)peroxide and 2,5-dimethyl-2,5-di(tert-butylperoxy)-3-hexyne. 2,5-Dimethyl-2,5-di-tert-butyl-peroxyhexane (DHBP) has enabled functionalized polyolefins that give good results to be synthesized.

In order to carry out the grafting, all devices known for this purpose may be used. Thus, either external or internal mixers may be worked with. Internal type mixers are the most suitable and among these, BRABENDER® batch mixers and continuous mixers, such as extruders. Extruders normally comprise at least the following parts: a feed zone and at its exit an outlet zone preceded by a compression zone, the latter forcing the molten mass to pass through the outlet zone. Grafting is preferably carried out in an extruder.

The amount of acid and/or anhydride groups grafted, expressed as the amount of graftable monomer grafted relative to the weight of the functionalized polyolefin (gPO), is advantageously greater than 0.10% by weight, preferably greater than 0.20% by weight, and particularly preferably greater than 0.30% by weight. In addition, this amount is advantageously less than or equal to 2.0% by weight, preferably less than or equal to 1.5% by weight, and particularly preferably less than or equal to 1.0% by weight.

At least some of the acid and/or anhydride groups included in the functionalized polyolefin (gPO) may optionally be completely or partially neutralized by at least one neutralizing agent.

A preferred functionalized polyolefin (gPO) is a functionalized polyolefin whose acid and/or anhydride groups are not neutralized.

Another preferred functionalized polyolefin (gPO) is a functionalized polyolefin whose acid and/or anhydride groups are completely or partially neutralized by at least one neutralizing agent.

The neutralizing agent may especially comprise at least one metal hydroxide and/or at least one inorganic salt and/or at least one organic salt.

The inorganic salt, whether it is used alone or as a mixture, is preferably a carbonate, a bicarbonate, a phosphate or a monohydrogenphosphate of a metal, which may especially be an alkali metal, an alkaline-earth metal, a metal from group IIIa of the Periodic Table of the Elements or a transition metal. Carbonates are particularly preferred. Sodium carbonate is most particularly preferred.

The organic salt, whether it is used alone or as a mixture, is preferably a carboxylate or a monohydroxycarboxylate or polyhydroxycarboxylate of a metal, which may especially be an alkali metal, an alkaline-earth metal, a metal from group IIIa of the Periodic Table of the Elements or a transition metal.

The neutralizing agent preferably comprises at least one organic salt, such as zinc acetate, sodium lactate and sodium tartrate.

The neutralizing agent particularly preferably comprises at least one organic salt and at least one inorganic salt, such as the zinc acetate and sodium carbonate, and sodium lactate and sodium carbonate pairs.

The neutralizing agent is used in an amount preferably greater than 0.5 molar equivalents relative to the number of acid and/or anhydride groups of the functionalized polyolefin (gPO). In addition, it is used in an amount preferably less than 3 molar equivalents relative to the number of acid and/or anhydride groups of the functionalized polyolefin (gPO).

The functionalized polyolefin (gPO) has a weight-average molecular weight advantageously below 80000, preferably below 70000 and particularly preferably below 60000. In addition, the functionalized polyolefin (gPO) has a weight-average molecular weight advantageously above 10000, preferably above 20000 and particularly preferably above 30000. Excellent results have been obtained when the polyolefin (gPO) has a weight-average molecular weight between 30000 and 60000.

The weight-average molecular weight of the functionalized polyolefin (gPO) is easily determined by gel permeation chromatography (GPC), with 1,2,4-trichlorobenzene as the solvent.

The functionalized polyolefin (gPO) advantageously comprises little free (ungrafted) graftable monomer. This amount is preferably below 500 ppm. It is particularly preferably below 200 ppm.

The functionalized polyolefin (gPO) is normally contained in the aqueous emulsion in the form of solid particles, which are often of a small size. The number-average diameter of these solid particles is preferably less than 2 µm, particularly preferably less than 600 nm and most particularly preferably less than 200 nm; this is, in addition, normally greater than 2 nm and preferably greater than 20 nm. It may be determined by any technique known by a person skilled in the art; advantageously, an electron microscope technique coupled with a software image analysis technique will be used.

The aqueous emulsion according to the invention advantageously comprises more than 5% by weight, preferably more than 10% by weight, particularly preferably more than 15% by weight, and most particularly preferably more than 20% by weight, of the functionalized polyolefin (gPO) relative to the total weight of the aqueous emulsion. In addition, it advantageously comprises less than 70% by weight, preferably less than 50% by weight, and particularly preferably less than 35% by weight of the functionalized polyolefin (gPO) relative to the total weight of the aqueous emulsion.

The aqueous emulsion according to the invention comprises (ii) at least one emulsifier. As examples of emulsifiers, mention may be made of anionic emulsifiers, alkoxylated anionic emulsifiers, cationic emulsifiers, alkoxylated cationic emulsifiers, amphoteric emulsifiers, alkoxylated amphoteric emulsifiers, and alkoxylated non-ionic emulsifiers.

In the present description the terms "anionic emulsifiers", "cationic emulsifiers" and "amphoteric emulsifiers" are understood to mean non-alkoxylated emulsifiers, as opposed to the various alkoxylated emulsifiers listed above.

As examples of cationic emulsifiers, mention may be made of primary amine hydrochlorides, secondary amine hydrochlorides and quaternary ammonium salts such as the NORAMIUM® CES80 emulsifier sold by CECA.

As examples of anionic emulsifiers, mention may be made of monoalkyl or dialkyl sodium sulphosuccinates; sodium or ammonium nonylphenyl phosphates; sodium, ammonium or potassium alkyl carboxylates; sodium or ammonium alkyl sulphates, such as ammonium or sodium, linear or branched, $C_6$, $C_8$, $C_{10}$, $C_{12}$, $C_{14}$, $C_{16}$ or $C_{18}$, alkyl sulphates; sodium primary or secondary alkyl sulphonates; and sodium or ammonium alkylaryl sulphonates, such as sodium or ammonium n-dodecylbenzene and tetrapropylbenzene sulphonates.

As examples of amphoteric emulsifiers, mention may be made of the emulsifiers that comprise a carboxyl group (—COOH at acid pH/—COO$^-$Na$^+$, for example, at basic pH) and an amine group (—NH$_2$ at basic pH and —NH$_3^+$Cl$^-$ at acid pH).

As indicated above, the emulsifier may be alkoxylated.

An alkoxylated emulsifier is an emulsifier whose chemical structure comprises a —(—R'—O—)$_j$— block where R' is an alkylene group and where j is a strictly positive integer. As examples of suitable alkylene groups, mention may be made of the ethylene group (in this case, the emulsifier is called ethoxylated), the propylene group (propoxylated emulsifier) and alkylene groups comprising more than three carbon atoms. Among the alkoxylated emulsifiers, the ethoxylated emulsifiers and the propoxylated emulsifiers are preferred. Furthermore, among the alkoxylated emulsifiers, those that have a degree of alkoxylation j less than 30 are particularly preferred; the alkoxylated emulsifiers having a degree of alkoxylation j from 2 to 15 are more particularly preferred; the most particularly preferred alkoxylated emulsifiers have a degree of alkoxylation j from 4 to 12 (i.e. they comprise at least four and at most 12 mols of alkylene oxide).

As examples of alkoxylated cationic emulsifiers, mention may be made of ethoxylated primary amine hydrochlorides and ethoxylated secondary amine hydrochlorides, such as the hydrochlorides of certain emulsifiers from the NORAMOX® range sold by CECA.

As examples of alkoxylated anionic emulsifiers, mention may be made of alkoxylated monoalkyl sodium sulphosuccinates; alkoxylated sodium or ammonium nonylphenyl phosphates; alkoxylated ammonium or sodium alkyl sulphates such as sodium n-lauryl sulphates ethoxylated with 2, 4, 6, 8, 10 and 12 mols of ethylene oxide (that is to say for which j is equal to 2, 4, 6, 8, 10 or 12 respectively); alkoxylated alkylaryl sulphonates, such as ethoxylated octyl phenyl and nonylphenyl sulphonates.

As examples of alkoxylated amphoteric emulsifiers, mention may be made of the emulsifiers that comprise a carboxy group (—COOH at acid pH/—COO$^-$Na$^+$ for example at basic pH) and an amine group (—NH$_2$ at basic pH and —NH$_3^+$Cl$^-$ at acid pH), ethoxylated with 4 or 8 mols of ethylene oxide.

As examples of alkoxylated non-ionic emulsifiers, mention may be made of the alkylene oxide condensates of fatty acids such as the ethylene oxide condensates of lauric acid having 5 or 10 mols of ethylene oxide; the alkylene oxide condensates of fatty alcohols such as the ethylene oxide condensates of lauric alcohol having 2, 4, 7, 10 or 12 mols of ethylene oxide and the propylene oxide condensates of lauric alcohol having 4 or 8 mols of propylene oxide; the alkylene oxide condensates of alkyl phenols, such as the ethylene oxide condensates of nonylphenol, the ethylene oxide condensates of octylphenol and such as the propylene oxide condensates of nonylphenol, ethoxylated sorbitan esters, ethylene oxide condensates of fatty amides and ethylene oxide condensates of fatty amines.

The alkoxylated non-ionic emulsifiers are often alkylene oxide condensates of a fatty substance (acid, alcohol, amide, amine). Said fatty substance advantageously contains from 6 to 24 carbon atoms, preferably from 10 to 18 carbon atoms and particularly preferably from 12 to 16 carbon atoms.

The emulsifier is preferably an alkoxylated non-ionic emulsifier chosen from the alkylene oxide condensates of fatty acids, the alkylene oxide condensates of fatty alcohols and the alkylene oxide condensates of alkylphenol.

The aqueous emulsion according to the invention advantageously comprises more than 0.5% by weight, preferably more than 1% by weight, particularly preferably more than 2% by weight, and most particularly preferably more than 5% by weight of the emulsifier relative to the total weight of the aqueous emulsion. In addition, it advantageously comprises less than 30% by weight, preferably less than 20% by weight, and particularly preferably less than 10% by weight of the emulsifier relative to the total weight of the aqueous emulsion.

The aqueous emulsion according to the invention comprises (iii) at least one liquid dispersant comprising water. This liquid is advantageously used as a dispersion medium for the functionalized polyolefin (gPO) and the carbon nanotubes. Besides water, the liquid dispersant may contain any liquid compound or mixture of liquid compounds in which the functionalized polyolefin (gPO) and the carbon nanotubes may be dispersed, and held in dispersion thanks to the joint presence of the emulsifier. This liquid compound or this mixture of liquid compounds is generally soluble or dispersible in water. Examples of liquid compounds that can be used are alcohols and natural and synthetic oils. However, it is preferred for practical reasons, that the dispersant is essentially formed from water. Particularly preferably, the dispersant is composed of water.

The aqueous emulsion according to the invention advantageously comprises more than 25% by weight, preferably more than 40% by weight, particularly preferably more than 50% by weight, and most particularly preferably more than 60% by weight of the dispersant relative to the total weight of the aqueous emulsion. In addition, it advantageously comprises less than 90% by weight, preferably less than 80% by weight, and particularly preferably less than 70% by weight of the dispersant relative to the total weight of the aqueous emulsion.

An essential characteristic of the aqueous emulsion according to the invention is that besides (i) the functionalized polyolefin (gPO), (ii) the emulsifier and (iii) the dispersant, it contains (iv) carbon nanotubes.

In the present description, the term "carbon nanotube" is understood to mean any material having a structure comprising at least one layer of graphene (as defined above) rolled up in the shape of a hollow cylinder capped at at least one of its ends, and preferably at each of its ends, by a half molecule of a fullerene (as defined above). The term "cylinder" should be understood in the broad geometric sense as being a surface resulting from the revolution of a straight line parallel to a fixed rectilinear axis, creating a curve around the latter axis. Among the shapes that this curve may take on, mention may be made, for example, of the circle and the ellipse. The carbon nanotube that can be used according to the invention may have only one graphene monolayer, in which case it is generally known as a "single-wall carbon nanotube" (SWCNT). The carbon nanotube may also be a coaxial assembly of several SWCNTs of different diameters, in which case it is generally known as a "multi-wall carbon nanotube" (MWCNT). MWCNTs may generally comprise from 5 to 100, preferably from 12 to 50 coaxial SWCNTs. It is preferred to incorporate MWCNTs in the aqueous emulsions according to the invention.

The number-average diameter of the carbon nanotubes (iv) that can be used according to the invention may vary within a wide range, especially depending on whether it is a SWCNT or a MWCNT. This diameter is generally greater than 0.4 nanometers, preferably greater than 3 nanometers, more particularly greater than 5 nanometers. It is generally less than 500 nanometers, preferably less than 100 nanometers, more particularly less than 70, even 50 nanometers. Typical diameters of MWCNTs are between 8 and 30 nanometers.

The number-average length of the carbon nanotubes (iv) that can be used according to the invention, measured along its longitudinal axis, is generally significantly greater than its average diameter. It may be up to hundreds, even thousands, of times higher than this average diameter. This average length is generally greater than 0.1 micron, preferably greater than 0.5 microns, more particularly greater than 0.8 microns. It is generally less than 500 microns, preferably less than 100 microns, more particularly less than 30 microns.

The number-average diameter and length of the carbon nanotubes (iv) may be determined by any technique known to a person skilled in the art; advantageously, an electron microscopy technique coupled with a software image analysis technique will be used.

The carbon nanotube that can be used according to the invention may be manufactured according to any known method. Methods for preparing carbon nanotubes and their subsequent purification are described in "Carbon Nanotubes—Preparation and Properties", supra, pages 139 to 160. A method that results in MWCNTs of acceptable purity (at least 90%, preferably at least 95% carbon content) is deposition of vaporized carbon.

The carbon nanotube that can be used according to the invention and that generally proves to be chemically stable and difficult to wet with solvents, may optionally be functionalized, that is to say that its outer surface may be chemically modified by functional groups, in order to improve, for example, the hydrophilic character thereof. This functionalization of the nanotube may be of non-covalent or covalent nature, in the sense which is understood, for example, in Kirk-Othmer Encyclopedia of Chemical Technology, supra, pages 8 and 9). The covalent functionalization is generally preferred and may be carried out in a conventional manner by treatment with oxidizers, acids, bases, etc. The functional groups may especially be carboxyl groups, amine groups, thiol groups, hydroxy groups, etc. The preferred functional groups are hydroxy groups.

The aqueous emulsion according to the invention advantageously comprises more than 0.03% by weight, preferably more than 0.15% by weight, particularly preferably more than 0.3% by weight of carbon nanotubes relative to the total weight of the aqueous emulsion. It advantageously comprises less than 5% by weight, preferably less than 2% by weight and particularly preferably less than 1% by weight of carbon nanotubes relative to the total weight of the aqueous emulsion.

The aqueous emulsion may optionally comprise, in addition, usual additives for polyolefins, in an amount advantageously ranging up to 40% by weight, preferably up to 10% by weight, particularly preferably up to 5% by weight, and most particularly preferably up to 1% by weight, relative to the weight of the functionalized polyolefin (gPO).

As examples of such usual additives, mention may be made of antioxidants such as sterically hindered phenols, lubricants, filler materials, colorants, nucleating agents, UV stabilizers, antacids, such as calcium stearate and metal-deactivating agents.

If necessary, the nature and amount of these usual additives are normally chosen so as not to affect the quality, in particular the uniformity and the stability, of the aqueous emulsion.

Another subject of the invention is a process for manufacturing the aqueous emulsion as described above. This process comprises the steps according to which:
  a first emulsion (a) is prepared comprising carbon nanotubes (iv), a portion (ii-a) of the emulsifier (ii) and a portion (iii-a) of the dispersant (iii);
  a second emulsion (b) is prepared comprising the functionalized polyolefin (gPO), a portion (ii-b) of the emulsifier (ii) and a portion (iii-b) of the dispersant (iii);
  the aqueous emulsion is formed by mixing emulsion (a) with emulsion (b).

It has been observed, surprisingly, that the formation of the aqueous emulsion by mixing distinct emulsions of carbon nanotubes [emulsion (a)] and of functionalized polyolefin [emulsion (b)], and also carried out under the process according to the invention, favoured the production of a final aqueous dispersion in which the nanotubes and the functionalized polyolefin were dispersed uniformly and stably. On the other hand, it has been verified that other methods, especially those consisting in incorporating nanotubes in the dry state into an emulsion of functionalized polyolefin, generally did not lead to such advantageous results.

The method of mixing the emulsions (a) and (b) to make up the aqueous emulsion formed, is not critical; this mixing may be carried out according to any known method. It is normally carried out with stirring. It is preferred to make use of mechanical and/or magnetic and/or ultrasonic stirring means in order to perfect the homogenisation of the aqueous emulsion formed.

All the definitions, mentions and limitations listed above in the description of the aqueous emulsions according to the invention, in connection with, respectively:
  (i) the functionalized polyolefin (gPO);
  (ii) the emulsifier;
  (iii) the dispersant;
  (iv) the carbon nanotubes;
and the amounts in which these ingredients are present in these emulsions, apply, mutatis mutandis, to the process for manufacturing said emulsions.

The carbon nanotubes (iv) are contained in the emulsion (a) in an amount, relative to the total weight of the emulsion (a), advantageously greater than 0.1% by weight, preferably greater than 0.2% by weight, and particularly preferably greater than 0.5% by weight. This same quantity is, in addition, advantageously less than 10% by weight, preferably less than 3% by weight and particularly preferably less than 2% by weight.

The grafted polyolefin (gPO) is contained in the emulsion (b) in an amount, relative to the total weight of the emulsion (b), advantageously greater than 5% by weight, preferably greater than 10% by weight and particularly preferably greater than 20% by weight. This same amount is, in addition, advantageously less than 45% by weight, preferably less than 35% by weight and particularly preferably less than 30% by weight.

The amount of emulsifier (ii-b) contained in the emulsion (b), relative to the total weight of the emulsion (b), is advantageously greater than 1% by weight, preferably greater than 3% by weight, and particularly preferably greater than 20% by weight. This same quantity is, in addition, advantageously less than 30% by weight, preferably less than 20% by weight and particularly preferably less than 10% by weight.

The portions (ii-a) and (ii-b) of the emulsifier (ii) together normally make up all of the emulsifier (ii).

The amount of dispersant (iii-b) contained in the emulsion (b), relative to the total weight of the emulsion (b), is advantageously greater than 50% by weight, preferably greater than 60% by weight and particularly preferably greater than 65% by weight. This same quantity is, in addition, advantageously less than 90% by weight, preferably less than 80% by weight and particularly preferably less than 70% by weight.

The portions (iii-a) and (iii-b) of the dispersant together normally make up all of the dispersant (iii).

The portions (ii-a) and (ii-b) of the emulsifier (ii) may be of identical or different chemical nature; they are preferably of the same nature. Similarly, the portions (iii-a) and (iii-b) of the dispersant (iii) may be of identical or different chemical nature; they are preferably of the same nature.

The process according to the invention may optionally, in addition, comprise one or both of the following steps, prior to the actual preparation of emulsions (a) and (b):
- a step of preparing the emulsion (a) according to which the carbon nanotubes (iv) are dispersed with stirring in a liquid medium (MLa) comprising the portion (ii-a) of the emulsifier (ii) and the portion (iii-a) of the dispersant (iii); and
- a step of preparing the emulsion (b) according to which the functionalized polyolefin (gPO) in the melt state is dispersed with stirring in a liquid medium (MLb) comprising the portion (ii-b) of the emulsifier (ii) and the portion (iii-b) of the dispersant (iii), so as to form an emulsion of globules of functionalized polyolefin (gPO) in the melt state, then it is cooled in order to solidify said globules.

Advantageously, any known means for dispersing a solid in a liquid homogeneously and stably will be used, for the purposes of dispersing the carbon nanotubes (iv) in the liquid medium (MLa) in order to form the emulsion (a). Similarly, advantageously, any known means for dispersing a liquid in another liquid homogeneously and stably will be used, for the purposes of dispersing the functionalized polyolefin (gPO) in the melt state in the liquid medium (MLb) in order to form the emulsion (b). Thus, these dispersions may especially be promoted by making use of mechanical or magnetic stirring means. It is also possible to make use of the known technique of ultrasonic stirring.

The aqueous emulsion according to the present invention may advantageously be used to coat the most diverse substrates with a layer having an electrically conductive and/or thermally conductive character. The coated substrates may be formed from natural or synthetic materials, from metals, from plastics, etc. The coated substrates may be flexible or rigid. They may be substantially one-dimensional, such as for example fibres or strands; substantially two-dimensional, such as for example sheets and plates; substantially three-dimensional, such as for example hollow bodies or solid bodies.

In practice, in order to coat these substrates with a layer having an electrically conductive and/or thermally conductive character, the aqueous emulsion is applied at least once onto at least one part of their surface, so that at least one part of said surface is coated with a wet layer composed of the aqueous emulsion. Next, at least some of the water is removed from the wet layer.

The application of the aqueous emulsion on to at least one part of the substrate surface is advantageously carried out by coating said part with the aqueous emulsion.

The final layer is preferably essentially dry, that is to say that most of the water is removed from the wet layer.

The layer coating at least one part of the substrate surface generally has a thickness between 0.1 and 1000 µm. It preferably has a thickness greater than 1 µm, particularly preferably greater than 5 µm, and more particularly preferably greater than or equal to 8 µm.

In addition, this layer preferably has a thickness of less than 100 µm, particularly preferably less than 50 µm, most particularly preferably less than or equal to 30 µm.

Excellent results have been obtained when the layer has a thickness between 8 and 30 µm.

The examples that follow are intended to illustrate the invention without however limiting the scope thereof.

EXAMPLE 1

According to the Invention

PRIEX® 25097 resin, sold by Solvay, is a non-neutralized maleic anhydride grafted propylene/ethylene random copolymer, comprising around 5% of repeat units derived from ethylene, a weight-average molecular weight of around 55000, and an amount of grafted anhydride groups, expressed as the amount of graftable maleic anhydride grafted, of around 0.45% by weight (amount relative to the weight of the grafted polyolefin).

An emulsion (b) was prepared, composed of around 25% by weight of the commercial PRIEX® 25097 resin, around 7% by weight of an alkoxylated non-ionic emulsifier and around 68% by weight of water, according to a technique well-proven by a person skilled in the art who is a specialist in preparing aqueous emulsions. The emulsion (b) thus obtained is by the way sold by Solvay, under the name PRIEX® 702.

Introduced into this emulsion (b) was an emulsion (a) containing 1% by weight of MWCNTs dispersed in water using an alkoxylated non-ionic emulsifier, which emulsion (b) is sold by Nanocyl under the name NANOCYL® 3153.

These MWCNTs had, according to their manufacturer, a number-average diameter of 10 nanometers, a number-average length between 0.1 and 10 microns, a carbon purity greater than 95% and a surface modified by —OH functional groups.

The emulsion (a) of MWCNTs was mixed, with stirring, with emulsion (b), in an amount so that the MWCNT content in the final aqueous emulsion thus formed was 0.7% by weight, relative to the total weight of the aqueous emulsion.

It was observed that the MWCNTs thus introduced in the form of emulsion (a), dispersed very well in the emulsion (b) and did not settle.

It was therefore possible to manufacture in that way an aqueous emulsion of grafted polyolefin and carbon nanotubes in accordance with the present invention.

EXAMPLE 2 C

This example is given by way of comparison.

The emulsion (b) described in Example 1 [PRIEX® 702 emulsion] was again used.

The same MWCNTs as those used in Example 1 were added thereto, but this time directly in a powder form.

It was observed that the MWCNTs in powder form dispersed very poorly in the emulsion (b).

Despite the use of magnetic stirrers, an Ultraturax mixer and ultrasounds, the MWCNTs rapidly settled, so that it was impossible for any stable and uniform dispersion of grafted polyolefin and carbon nanotubes to be manufactured.

The invention claimed is:

1. An aqueous emulsion comprising:
   (i) at least one functionalized polyolefin (gPO), obtained by grafting, on at least one unfunctionalized polyolefin (PO), an acid and/or anhydride group, the acid and/or anhydride group being optionally completely or partially neutralized by at least one neutralizing agent;
   (ii) at least one emulsifier;
   (iii) at least one dispersant containing water; and
   (iv) carbon nanotubes.

2. The aqueous emulsion according to claim 1, wherein the acid and/or anhydride group is-grafted onto the unfunctionalized polyolefin (PO) through the intervention of at least one graftable monomer, and wherein the amount of acid and/or anhydride group grafted, expressed as the amount of graftable monomer grafted relative to the weight of the functionalized polyolefin (gPO), is greater than 0.30% by weight.

3. The aqueous emulsion according to claim 1, wherein the functionalized polyolefin (gPO) has a weight average molecular weight below 60000.

4. The aqueous emulsion according to claim 1, wherein the functionalized polyolefin (gPO) is obtained by grafting maleic anhydride onto a random copolymer of propylene and ethylene comprising from 2 to 6% by weight of repeat units derived from ethylene.

5. The aqueous emulsion according to claim 1, wherein the emulsifier (ii) is an alkoxylated non-ionic emulsifier selected from the group consisting of an alkylene oxide condensate of a fatty acid, an alkylene oxide condensate of fatty alcohol, and an alkylene oxide condensate of an alkylphenol.

6. The aqueous emulsion according to claim 1, wherein the carbon nanotubes (iv) are multiwalled carbon nanotubes.

7. The aqueous emulsion according to claim 1, wherein the carbon nanotubes (iv) are functionalized by hydroxy groups.

8. The aqueous emulsion according to claim 1, which comprises more than 0.3% by weight, relative to the total weight of the aqueous emulsion, of carbon nanotubes (iv).

9. A process for manufacturing an aqueous emulsion according to claim 1, comprising the steps according to which:
   a first emulsion (a) is prepared comprising carbon nanotubes (iv), a portion (ii-a) of the emulsifier (ii) and a portion (iii-a) of the dispersant (iii);
   a second emulsion (b) is prepared comprising the functionalized polyolefin (gPO), a portion (ii-b) of the emulsifier (ii) and a portion (iii-b) of the dispersant (iii); and
   the aqueous emulsion is formed by mixing emulsion (a) with emulsion (b).

10. A method for preparing a substrate coated with a layer having an electrically conductive and/or a thermally conductive character, wherein the aqueous emulsion according to claim 1 is applied at least once to at least one part of the substrate surface, so that at least one part of said surface is coated with a wet layer composed of the aqueous emulsion, followed by essentially removing water from the wet layer.

11. The aqueous emulsion according to claim 1, wherein the unfunctionalized polyolefin comprises more than 50% by weight of one olefin repeat unit.

12. The aqueous emulsion according to claim 1, wherein the unfunctionalized polyolefin is liner.

13. The aqueous emulsion according to claim 1, wherein the unfunctionalized polyolefin comprises an olefin with from 2 to 6 carbons.

14. The aqueous emulsion according to claim 1, wherein the acid and/or anhydride group grafted on the unfunctionalized polyolefin is a monoethylenically unsaturated monocarboxylic acid, a monoethylenically unsaturated dicarboxylic acid, an anhydride thereof, or a metal salt thereof.

15. The aqueous emulsion according to claim 14, wherein the acid and/or anhydride group grafted on the unfunctionalized polyolefin comprises from 3 to 20 carbon atoms.

16. The aqueous emulsion according to claim 1, wherein the acid and/or anhydride group grafted on the unfunctionalized polyolefin is acrylic acid, methacrylic acid, maleic acid, fumaric acid, itaconic acid, crotonic acid, citraconic acid, maleic anhydride, itaconic anhydride, crotonic anhydride or citraconic anhydride.

* * * * *